US012761902B2

(12) United States Patent
Ariga et al.

(10) Patent No.: US 12,761,902 B2
(45) Date of Patent: *Oct. 13, 2026

(54) PROGRAM UPDATE SYSTEM AND VEHICLE MANAGEMENT SERVER

(71) Applicant: TOYOTA JIDOSHA KABUSHIKI KAISHA, Toyota (JP)

(72) Inventors: Takanori Ariga, Nagoya (JP); Tomoyasu Ishikawa, Nagoya (JP); Jun Hamasaki, Toyota (JP); Shoichi Nagamitsu, Miyoshi (JP); Yusuke Takatsuna, Ama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

This patent is subject to a terminal disclaimer.

(21) Appl. No.: 18/907,812

(22) Filed: Oct. 7, 2024

(65) Prior Publication Data

US 2025/0028522 A1 Jan. 23, 2025

Related U.S. Application Data

(63) Continuation of application No. 18/327,700, filed on Jun. 1, 2023, now Pat. No. 12,141,574, which is a (Continued)

(30) Foreign Application Priority Data

Nov. 8, 2019 (JP) ................................ 2019-203251
Mar. 18, 2020 (JP) ................................ 2020-048336

(51) Int. Cl.
*G06F 8/65* (2018.01)
*B60R 16/023* (2006.01)
(Continued)

(52) U.S. Cl.
CPC ............... *G06F 8/65* (2013.01); *B60W 50/14* (2013.01); *G06F 8/656* (2018.02); *G06F 8/66* (2013.01);
(Continued)

(58) Field of Classification Search
None
See application file for complete search history.

(56) References Cited

U.S. PATENT DOCUMENTS 8,655,541 B2 * 2/2014 You ......................... H04L 67/34
717/173
9,720,680 B2 * 8/2017 Diedrich ............. H04B 1/3822
(Continued)

FOREIGN PATENT DOCUMENTS

CN 1482538 A * 3/2004 ............... G06F 8/54
CN 1215409 C * 8/2005 ............... G06F 8/65
(Continued)

OTHER PUBLICATIONS

Office Action dated Aug. 1, 2022 issued in corresponding U.S. Appl. No. 17/081,064.
(Continued)

*Primary Examiner* — Kevin R Steckbauer
(74) *Attorney, Agent, or Firm* — Oblon, McClelland, Maier & Neustadt, L.L.P.

(57) ABSTRACT

A vehicle management server is configured to transmit, to a vehicle, an update program for updating an existing program of an electronic device mounted on the vehicle. The vehicle management server includes a communicator and a controller. The communicator is configured to communicate with the vehicle. The controller is configured to control an update process. The controller is configured to determine, depending on a type of the update program, whether to present, to a vehicle user, an indication related to the update process for
(Continued)

the existing program using the update program, and transmit, when the controller determines to present the indication related to the update process to the vehicle user, information for causing a predetermined information terminal to display the indication related to the update process to the vehicle via the communicator.

20 Claims, 3 Drawing Sheets

Related U.S. Application Data continuation of application No. 17/081,064, filed on Oct. 27, 2020, now Pat. No. 11,704,106.

(51) Int. Cl.
*B60W 50/14* (2020.01)
*G06F 8/656* (2018.01)

(52) U.S. Cl.
CPC .... *B60R 16/0231* (2013.01); *B60W 2050/146* (2013.01)

(56) References Cited

U.S. PATENT DOCUMENTS

| | | | | |
|---|---|---|---|---|
| 9,841,970 | B2 * | 12/2017 | Vangelov | G06F 8/654 |
| 9,843,926 | B2 * | 12/2017 | Dietz | H04L 63/10 |
| 9,944,282 | B1 * | 4/2018 | Fields | G06F 8/65 |
| 9,946,531 | B1 * | 4/2018 | Fields | G06F 8/65 |
| 10,007,263 | B1 * | 6/2018 | Fields | G06F 8/65 |
| 10,114,634 | B2 * | 10/2018 | Quin | G06F 8/65 |
| 10,157,423 | B1 * | 12/2018 | Fields | G06F 8/65 |
| 10,324,463 | B1 * | 6/2019 | Konrardy | B60W 60/0059 |
| 10,353,695 | B2 * | 7/2019 | Endo | H04L 67/12 |
| 10,430,178 | B2 * | 10/2019 | Mitchell | H04W 4/44 |
| 10,514,900 | B2 * | 12/2019 | Teraoka | G06F 11/00 |
| 10,592,231 | B2 * | 3/2020 | Sakurai | H04L 67/34 |
| 10,599,420 | B2 * | 3/2020 | Quin | H04L 63/123 |
| 10,625,754 | B2 * | 4/2020 | Izumi | B60W 50/14 |
| 10,908,890 | B2 * | 2/2021 | Nakamura | H04W 4/40 |
| 11,163,549 | B2 * | 11/2021 | Sakurai | G06F 8/65 |
| 11,360,762 | B2 * | 6/2022 | Teraoka | G06F 8/658 |
| 11,579,865 | B2 * | 2/2023 | Sakurai | H04W 12/69 |
| 11,683,197 | B2 * | 6/2023 | Harata | B60W 20/10 370/252 |
| 11,704,106 | B2 * | 7/2023 | Ariga | G06F 8/66 701/36 |
| 11,989,546 | B2 * | 5/2024 | Harata | B60R 16/02 |
| 12,030,443 | B2 * | 7/2024 | Harata | G06F 8/65 |
| 12,141,574 | B2 * | 11/2024 | Ariga | B60W 50/14 |
| 2013/0079950 | A1 * | 3/2013 | You | H04L 67/12 701/1 |
| 2013/0104186 | A1 * | 4/2013 | Dietz | H04W 12/088 726/1 |
| 2014/0167967 | A1 * | 6/2014 | He | A61B 5/18 340/576 |
| 2014/0168399 | A1 * | 6/2014 | Plummer | A61B 5/18 348/78 |
| 2014/0310702 | A1 * | 10/2014 | Ricci | G06F 16/951 717/173 |
| 2016/0202966 | A1 * | 7/2016 | Vangelov | H04L 67/12 717/172 |
| 2017/0024201 | A1 * | 1/2017 | Diedrich | G06F 8/65 |
| 2017/0212746 | A1 * | 7/2017 | Quin | H04L 63/123 |
| 2017/0262277 | A1 * | 9/2017 | Endo | G06F 8/658 |
| 2019/0108014 | A1 * | 4/2019 | Nakamura | B60R 16/02 |
| 2019/0111907 | A1 * | 4/2019 | Harata | B60W 10/06 |
| 2019/0138292 | A1 * | 5/2019 | Quin | G06F 8/65 |
| 2019/0256109 | A1 * | 8/2019 | Izumi | B60W 50/14 |
| 2019/0258466 | A1 * | 8/2019 | Mitchell | H04L 67/34 |
| 2019/0279447 | A1 * | 9/2019 | Ricci | G06Q 10/00 |
| 2020/0050442 | A1 * | 2/2020 | Sakurai | H04W 4/48 |
| 2020/0183676 | A1 * | 6/2020 | Sakurai | H04L 67/34 |
| 2020/0186620 | A1 * | 6/2020 | Golgiri | B60W 30/16 |
| 2020/0233653 | A1 * | 7/2020 | Fukushima | B60R 16/02 |
| 2020/0249937 | A1 * | 8/2020 | Teraoka | G06F 8/658 |
| 2021/0141629 | A1 * | 5/2021 | Ariga | G06F 8/65 |
| 2021/0182048 | A1 * | 6/2021 | Harata | B60W 50/14 |
| 2021/0182049 | A1 * | 6/2021 | Harata | G06F 8/65 |
| 2022/0012043 | A1 * | 1/2022 | Sakurai | H04L 9/3239 |
| 2022/0197626 | A1 * | 6/2022 | Yamaguchi | B60W 50/14 |
| 2023/0305835 | A1 * | 9/2023 | Ariga | G06F 8/65 |
| 2024/0078104 | A1 * | 3/2024 | Yang | G06F 8/65 |
| 2025/0028522 | A1 * | 1/2025 | Ariga | G06F 8/656 |

FOREIGN PATENT DOCUMENTS

| | | | | | |
|---|---|---|---|---|---|
| CN | 102893574 | A | * | 1/2013 | H04L 63/14 |
| CN | 105094883 | A | * | 11/2015 | G06F 21/57 |
| CN | 106484474 | A | * | 3/2017 | G06F 8/654 |
| CN | 106708564 | A | * | 5/2017 | G06F 8/71 |
| CN | 107193578 | A | * | 9/2017 | G06F 8/71 |
| CN | 102893574 | B | * | 5/2018 | H04L 63/14 |
| CN | 110171429 | A | * | 8/2019 | B60R 16/0231 |
| CN | 110535941 | A | * | 12/2019 | H04L 67/34 |
| CN | 111032438 | A | * | 4/2020 | F02N 15/00 |
| CN | 111200631 | A | * | 5/2020 | G07C 5/008 |
| CN | 111201510 | A | * | 5/2020 | G06F 8/658 |
| CN | 111221547 | A | * | 6/2020 | G06F 11/302 |
| CN | 111284428 | A | * | 6/2020 | B60W 50/14 |
| CN | 111930410 | A | * | 11/2020 | G06F 8/656 |
| CN | 112602055 | A | * | 4/2021 | G06F 8/65 |
| CN | 112639725 | A | * | 4/2021 | G06F 8/65 |
| CN | 112748942 | A | * | 5/2021 | G06F 8/65 |
| CN | 112783521 | A | * | 5/2021 | B60R 16/023 |
| CN | 113703812 | A | * | 11/2021 | G06F 8/65 |
| CN | 114661331 | A | * | 6/2022 | B60W 50/04 |
| CN | 113268259 | B | * | 3/2024 | G06F 8/65 |
| CN | 120045205 | A | * | 5/2025 | B60R 16/023 |
| DE | 102010008816 | A1 | * | 8/2011 | H04L 63/14 |
| DE | 102016100203 | A1 | * | 7/2016 | H04W 4/50 |
| DE | 102016006701 | A1 | * | 12/2016 | B60W 50/00 |
| DE | 102017104830 | A1 | * | 9/2017 | G06F 8/71 |
| DE | 112017002909 | T5 | * | 2/2019 | G06F 11/00 |
| DE | 112017002919 | T5 | * | 3/2019 | B60R 16/02 |
| DE | 102019104061 | A1 | * | 8/2019 | B60W 50/00 |
| DE | 112018004090 | T5 | * | 5/2020 | B60R 16/02 |
| DE | 102019132742 | A1 | * | 6/2020 | B60W 30/16 |
| DE | 112019004045 | T5 | * | 5/2021 | G06F 8/65 |
| DE | 112019004058 | T5 | * | 5/2021 | G06F 8/65 |
| DE | 102017104830 | B4 | * | 12/2023 | G06F 8/65 |
| EP | 3822771 | A1 | * | 5/2021 | B60R 16/023 |
| EP | 3883212 | A1 | * | 9/2021 | H04L 67/12 |
| EP | 3822771 | B1 | * | 2/2023 | B60R 16/023 |
| JP | 2004-12319 | A | | 1/2004 | |
| JP | 2004012319 | A | * | 1/2004 | |
| JP | 2005349878 | A | * | 12/2005 | |
| JP | 3855621 | B2 | * | 12/2006 | |
| JP | 3913116 | B2 | * | 5/2007 | |
| JP | 3967186 | B2 | * | 8/2007 | G01C 21/3856 |
| JP | 4234062 | B2 | * | 3/2009 | |
| JP | 2010-78533 | A | | 4/2010 | |
| JP | 2010078533 | A | * | 4/2010 | |
| JP | 2011148398 | A | * | 8/2011 | |
| JP | 2014211681 | A | * | 11/2014 | G07B 15/00 |
| JP | 2016-38634 | A | | 3/2016 | |
| JP | 2016038634 | A | * | 3/2016 | |
| JP | 2017167646 | A | * | 9/2017 | G06F 8/71 |
| JP | 6281440 | B2 | * | 2/2018 | |
| JP | 6347834 | B2 | * | 6/2018 | B60R 16/02 |
| JP | 6365572 | B2 | * | 8/2018 | G06F 8/71 |
| JP | 6465258 | B1 | * | 2/2019 | G06F 8/65 |
| JP | WO2019030984 | A1 | * | 11/2019 | G06F 8/65 |
| JP | 2020-27621 | A | | 2/2020 | |
| JP | 2020-27631 | A | | 2/2020 | |
| JP | 2020027621 | A | * | 2/2020 | G06F 8/65 |
| JP | 2020027631 | A | * | 2/2020 | G06F 8/65 |
| JP | 2021-71960 | A | | 5/2021 | |
| JP | 2021-77319 | A | | 5/2021 | |
| JP | 2021071960 | A | * | 5/2021 | B60R 16/02 |
| JP | 2021077319 | A | * | 5/2021 | |

(56) References Cited

FOREIGN PATENT DOCUMENTS

| | | | | | |
|---|---|---|---|---|---|
| JP | 6915500 | B2 | * | 8/2021 | G06F 11/1433 |
| JP | 2021169308 | A | * | 10/2021 | G06F 8/66 |
| JP | 2025083373 | A | * | 5/2025 | B60W 50/14 |
| KR | 10-2017-0130037 | A | | 11/2017 | |
| KR | 20170130037 | A | * | 11/2017 | B60R 16/02 |
| KR | 101813529 | B1 | * | 12/2017 | B60R 16/0315 |
| KR | 20180057803 | A | * | 5/2018 | B60W 50/0205 |
| SE | 1550835 | A1 | * | 12/2016 | G06F 8/65 |
| SE | 540856 | C2 | * | 12/2018 | G06F 9/445 |
| TW | I599958 | B | * | 9/2017 | G06F 8/65 |
| WO | WO-0036503 | A2 | * | 6/2000 | G06F 8/63 |
| WO | WO-2011101414 | A1 | * | 8/2011 | H04L 63/10 |
| WO | WO-2012163093 | A1 | * | 12/2012 | G06F 8/65 |
| WO | WO-2017124174 | A1 | * | 7/2017 | G06F 8/65 |
| WO | WO-2018155184 | A1 | * | 8/2018 | B60R 16/02 |
| WO | WO-2019030984 | A1 | * | 2/2019 | F02N 15/00 |
| WO | WO-2019073932 | A1 | * | 4/2019 | G06F 8/658 |
| WO | WO-2019109513 | A1 | * | 6/2019 | G06F 8/65 |
| WO | WO-2022208424 | A1 | * | 10/2022 | H04L 67/12 |

OTHER PUBLICATIONS

Office Action dated Dec. 14, 2022 issued in corresponding U.S. Appl. No. 17/081,064.

Notice of Allowance dated Mar. 2, 2023 issued in corresponding U.S. Appl. No. 17/081,064.

Corrected Notice of Allowability dated Jun. 22, 2023 issued in corresponding U.S. Appl. No. 17/081,064.

Office Action dated Mar. 5, 2024 issued in corresponding U.S. Appl. No. 18/327,700.

Notice of Allowance dated Jul. 18, 2024 issued in corresponding U.S. Appl. No. 18/327,700.

Corrected Notice of Allowability dated Aug. 5, 2024 issued in corresponding U.S. Appl. No. 18/327,700.

* cited by examiner

FIG. 2

| UPDATE SCENARIO | TYPE OF UPDATE PROGRAM | | AUTOMATIC UPDATE SETTING | UPDATE EVENT | | | | | |
|---|---|---|---|---|---|---|---|---|---|
| | UPDATE CONTENT | UPDATE URGENCY LEVEL | | UPDATE START NOTIFICATION | DATA DL PERMISSION REQUEST | DATA DL COMPLETION NOTIFICATION | ACTIVATION PREPARATION COMPLETION NOTIFICATION | ACTIVATION PERMISSION REQUEST | UPDATE COMPLETION NOTIFICATION |
| 1 | ADDITION OF FUNCTION | LOW (FULL PERMISSION) | OFF | ✓ | ✓ | ✓ | ✓ | ✓ | ✓ |
| 2 | ADDITION OF FUNCTION | HIGH (PERMISSION OF DL) | OFF | ✓ | ✓ | ✓ | | | ✓ |
| 3 | ADDITION OF FUNCTION | HIGH (PERMISSION OF ACTIVATION) | OFF | ✓ | | | ✓ | ✓ | ✓ |
| 4 | ADDITION OF FUNCTION | — | ON | ✓ | | | | | ✓ |
| 5 | MODIFICATION OF FUNCTION SOLUTIONS OR MEASURES | LOW (FULL NOTIFICATION) | OFF | ✓ | | ✓ | ✓ | | ✓ |
| 6 | MODIFICATION OF FUNCTION SOLUTIONS OR MEASURES | HIGH (NOTIFICATION OF DL) | OFF | ✓ | | ✓ | | | ✓ |
| 7 | MODIFICATION OF FUNCTION SOLUTIONS OR MEASURES | HIGH (NOTIFICATION OF ACTIVATION) | OFF | ✓ | | | ✓ | | ✓ |
| 8 | MODIFICATION OF FUNCTION SOLUTIONS OR MEASURES | — | ON | ✓ | | | | | ✓ |
| 9 | OTHERS | — | — | | | | | | |

PROGRAM UPDATE SYSTEM AND VEHICLE MANAGEMENT SERVER

CROSS-REFERENCE TO RELATED APPLICATION

This application is a continuation of U.S. patent application Ser. No. 18/327,700 filed Jun. 1, 2023, which is a continuation of U.S. patent application Ser. No. 17/081,064 filed Oct. 27, 2020, that issued on Jul. 18, 2023, as U.S. Pat. No. 11,704,106, which claims priority to Japanese Patent Application No. 2019-203251 filed on Nov. 8, 2019, and Japanese Patent Application No. 2020-048336 filed on Mar. 18, 2020, each incorporated herein by reference in its entirety.

BACKGROUND

1. Technical Field

The present disclosure relates to a program update system and a vehicle management server.

2. Description of Related Art

Vehicles include a plurality of electronic devices called electronic control units (ECUs). The on-board device such as the ECU includes a controller typified by one or more central processing units (CPUs) and a storage that stores one or more programs to be executed by the controller, and executes respective functions. It is proposed that the program stored in the storage be rewritten and updated to a newer version to improve the functions of the electronic device. In particular, it is proposed that the vehicle receive program update data from an external server through wireless communication to update the program without visiting a maintenance shop or the like.

Japanese Unexamined Patent Application Publication No. 2011-148398 (JP 2011-148398 A) discloses a program update system configured to update a program installed in an ECU mounted on a vehicle. In this system, a management device manages version information and an update file for each vehicle identification (ID). Based on the vehicle ID transmitted from the ECU, the update file is transmitted to the ECU only when the version of the program installed in the ECU is not the latest version. Thus, distribution efficiency is improved.

SUMMARY

If all update statuses (completion notifications and permission requests) are displayed for a user or occupant of the vehicle (hereinafter referred to as "vehicle user") depending on progress of an update process irrespective of update contents provided by an update program, the vehicle user may feel annoyed. If no update status is displayed for the vehicle user irrespective of the progress of the update process, the vehicle user may feel anxiety.

The present disclosure provides a program update system and a vehicle management server in which the feeling of annoyance or anxiety of a vehicle user can be reduced.

One aspect of a technology disclosed herein relates to a vehicle management server configured to transmit, to a vehicle, an update program for updating an existing program of an electronic device mounted on the vehicle. The vehicle management server includes a communicator and a controller. The communicator is configured to communicate with the vehicle. The controller is configured to control an update process. The controller is configured to determine, depending on a type of the update program, whether to present, to a vehicle user, an indication related to the update process for the existing program using the update program, and transmit, when the controller determines to present the indication related to the update process to the vehicle user, information for causing a predetermined information terminal to display the indication related to the update process to the vehicle via the communicator.

Another aspect of the technology disclosed herein relates to a program update system including a vehicle, a vehicle management server, and an information terminal. The vehicle management server is configured to communicate with the vehicle to transmit, to the vehicle, an update program for updating an existing program of an electronic device mounted on the vehicle. The information terminal is configured to communicate with the vehicle management server. The vehicle management server is configured to determine, depending on a type of the update program, whether to present, to a vehicle user, an indication related to an update process for the existing program using the update program, and transmit, when the vehicle management server determines to present the indication related to the update process to the vehicle user, information for causing the information terminal to display the indication related to the update process to the vehicle.

According to the program update system and the vehicle management server of the technology disclosed herein, the feeling of annoyance or anxiety of the vehicle user can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an example of update scenarios stored in a storage of a vehicle management server.

DETAILED DESCRIPTION OF EMBODIMENTS

In a program update system according to a technology disclosed herein, a server prestores a plurality of update scenarios that defines update events (completion notifications and permission requests) in which an information terminal is caused to display indications related to update statuses based on, for example, the type of an update program. To update a program, information for causing the information terminal to display an indication associated with an update event defined in an update scenario linked to the update program is transmitted from the server to a vehicle. This operation reduces the feeling of annoyance or anxiety of a vehicle user about indications of update statuses in an update process for the program.

EMBODIMENT

An embodiment of the technology disclosed herein is described below in detail with reference to the drawings.

Configuration

Figure 1:
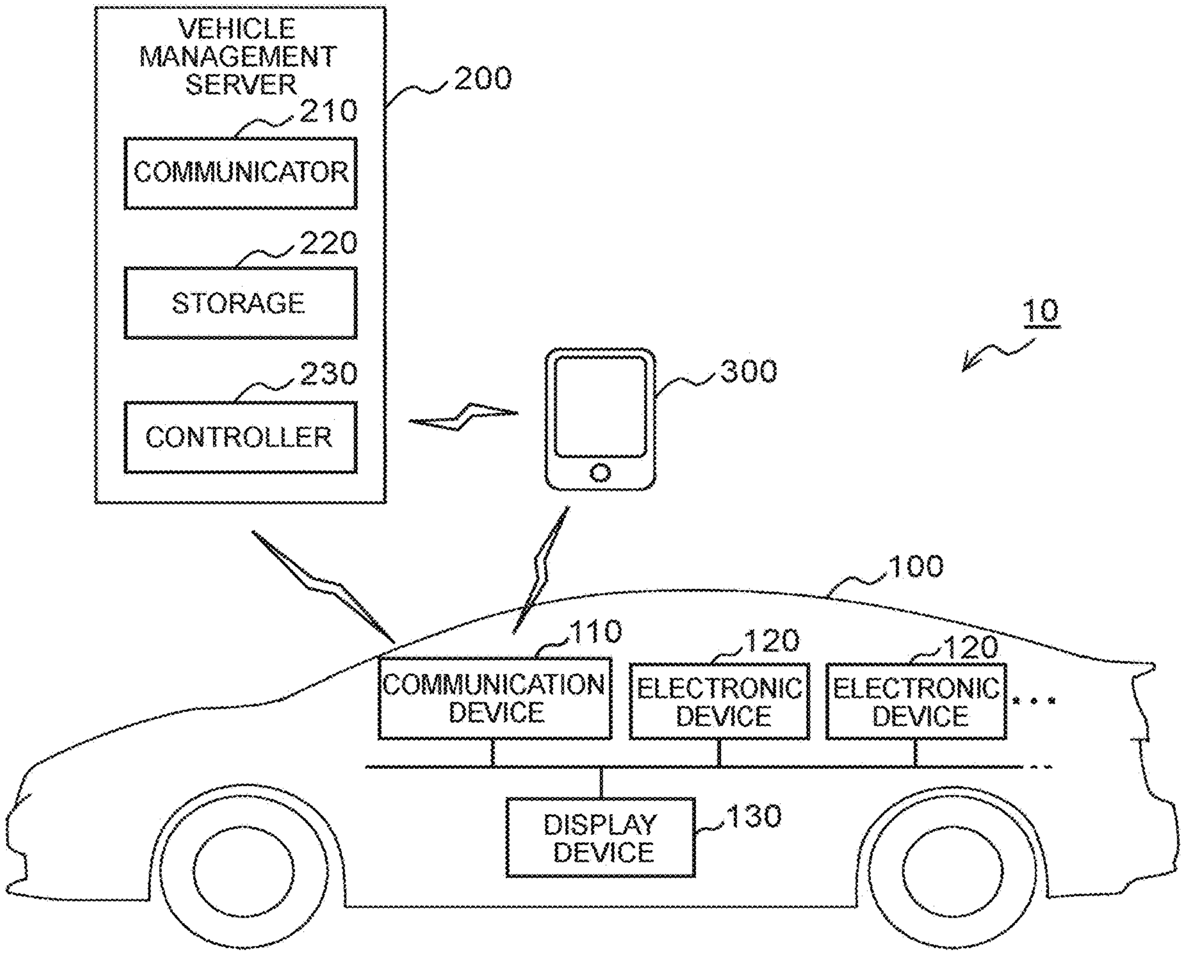
FIG. 1 is a diagram illustrating an example of the configuration of a program update system according to an embodiment.

FIG. 1 is a diagram illustrating an example of the configuration of a program update system according to the embodiment. A program update system 10 exemplified in FIG. 1 includes a vehicle 100, a vehicle management server 200, and a mobile device 300. The vehicle 100 includes a communication device 110, a plurality of electronic devices 120, and a display device 130. The number of the electronic devices 120 is not limited.

The communication device 110, the electronic devices 120, and the display device 130 are communicably connected together via an internal network such as a controller area network (CAN). The communication device 110 is a data communication module (DCM) or the like, and is communicably connected to the vehicle management server 200, the mobile device 300, or other external devices via a wireless network such as 4G or Wi-Fi.

The vehicle management server 200 manages update programs necessary to update existing programs of the electronic devices 120 mounted on the vehicle 100. The vehicle management server 200 includes a communicator 210, a storage 220, and a controller 230. The communicator 210 performs wireless communication with the communication device 110 of the vehicle 100 to receive an inquiry about an update from the vehicle 100 or download an update program to the vehicle 100. The storage 220 stores the update programs and update scenarios necessary to update the existing programs of the electronic devices 120. For example, the update scenario is information that defines a notification or request (described later) as an update event to be displayed in a program update process, as typified by an update status indicating progress of the update process. The update scenario is linked to an update program depending on the type of the update program. The controller 230 controls the vehicle management server 200, including update processes. For example, the controller 230 can determine, depending on the type of the update program, whether to present indications related to a plurality of update statuses to a vehicle user. In this embodiment, the controller 230 determines an indication related to each update status to be presented to the vehicle user by selecting an update scenario associated with the type of the update program from the storage 220.

FIG. 2 is a diagram illustrating an example of the update scenarios stored in the storage 220 of the vehicle management server 200. In the example of FIG. 2, nine update scenarios that define update events are provided based on the types of the update programs, that is, contents of updates to be provided by the update programs (update contents) and levels of urgency determined in advance based on the contents of the update programs and importance of the updates (update urgency levels), and based on whether the vehicle user sets an automatic update (automatic update setting).

The update event is information for causing an information terminal to display an indication associated with the event on a display screen of the information terminal. The information terminal of this embodiment corresponds to the display device 130 and the mobile device 300. Examples of the update event include (1) an update start notification, which notifies the vehicle user that an update process of an update program is started, (2) a data download (DL) permission request, which requests the vehicle user to permit download of the update program from the vehicle management server 200 to the electronic device 120, (3) a data DL completion notification, which notifies the vehicle user that the download of the update program from the vehicle management server 200 to the electronic device 120 is completed, (4) an activation preparation completion notification, which notifies the vehicle user that preparation for activation of the update process for an existing program using the update program is completed, (5) an activation permission request, which requests the vehicle user to permit the activation of the update process for the existing program using the update program (that is, a change to control contents), and (6) an update completion notification, which notifies the vehicle user that the update process for the existing program using the update program is completed. As the update event, any notification or permission request other than those described above may be set as appropriate. Examples of the other notification or permission request include a notification of a program to be updated prior to the update start notification, a request to permit the start of the update using the update program prior to the update start notification, or any other notification or permission request indicating the progress of the update process.

Regarding the update contents serving as one element of the type of the update program, the update scenarios are classified into, for example, update scenarios having contents in which control specifications of an actuator of the vehicle 100 are changed (update scenarios 1 to 8), and an update scenario having a content in which the control specifications of the actuator of the vehicle 100 are not changed (update scenario 9).

The contents in which the control specifications of the actuator of the vehicle 100 are changed (update scenarios 1 to 8) are contents in which the vehicle user can recognize the change before and after the program is updated. Examples of those contents include a content in which operations of devices related to behavior of the vehicle (such as a distance between the driver's vehicle and a preceding vehicle during driving assistance and an actuation timing and an actuation amount of an automatic brake) are changed, and a content in which operations of devices mounted on the vehicle (such as an opening/closing speed of an automatic slide door and timings to turn ON and OFF an automatic headlight) are changed. The contents in which the control specifications of the actuator of the vehicle 100 are changed are classified into contents in which a new function that is not previously installed in the vehicle 100 is added and the user of the vehicle 100 needs to permit the update in principle (update scenarios 1 to 4), and contents in which a function that is already installed in the vehicle 100 is modified or any solutions or measures are added to the existing function and the user of the vehicle 100 need not permit the update (update scenarios 5 to 8).

The content in which the control specifications of the actuator of the vehicle 100 are not changed (update scenario 9) is a content in which the vehicle user cannot recognize the change before and after the program is updated. Examples of this content include a content in which actions of a function of automatically collecting traveling data of the vehicle and transmitting the data to a predetermined data center (such as the type of data to be collected and a timing to upload the collected data) are changed. The program having the content in which the control specifications of the actuator of the vehicle 100 are not changed (update scenario 9) does not affect the vehicle user or the traveling of the vehicle. Therefore, the program can be updated without displaying any notification or permission request as the update event for the vehicle user irrespective of the status of the automatic update setting and the update urgency level.

Regarding the update urgency level serving as one element of the type of the update program, the update scenarios are classified into, for example, update scenarios having relatively low update urgency levels (update scenarios 1 and 5), and update scenarios having relatively high update urgency levels (update scenarios 2, 3, 6, and 7). The update scenarios having relatively low update urgency levels are defined such that the program update process can be executed while displaying all notifications for the vehicle user. The update scenarios having relatively high update urgency levels are classified into, for example, two categories depending on specific processes in the update process about which update event information is displayed for the vehicle user.

In the first category of the update scenarios having relatively high update urgency levels, update event information on a permission request and/or a notification is displayed about a process of downloading an update program (update scenarios 2 and 6). For example, the update events of the first category can be applied to an update program that requires confirmation of the vehicle user in advance as to whether data may be written in the vehicle 100, or an update program that requires a notification to the vehicle user about completion of download of the update program. Examples of the update program include an update program that requires a high communication cost and a long communication time due to a considerable amount of data.

In the second category of the update scenarios having relatively high update urgency levels, update event information on a permission request and/or a notification is displayed about a process of activating a downloaded update program (update scenarios 3 and 7). For example, the update events of the second category can be applied to an update program that requires a notification to the vehicle user about a change to be made on the vehicle control, or an update program that requires confirmation of the vehicle user in advance as to whether the vehicle control may be changed. Examples of the update program include an update program related to a change to behavior or riding quality of the vehicle.

The automatic update setting is an item that is provided to the vehicle 100 in advance and may arbitrarily be set by the vehicle user. When the automatic update is set to “OFF”, the update is executed based on the update scenario defined depending on the update urgency level during the program update process from the update start notification to the update completion notification (update scenarios 1 to 3 and 5 to 7). When the automatic update is set to “ON”, the update can be executed without indications associated with update events for the vehicle user irrespective of the update urgency level during the program update process from the update start notification to the update completion notification (update scenarios 4 and 8).

For example, each electronic device 120 is called electronic control unit (ECU) configured to perform various types of control for the vehicle 100. In the electronic device 120, one or more programs to be executed by a controller such as a CPU (not illustrated) are stored in a storage such as a random-access memory (RAM) (not illustrated). The electronic device 120 communicates with the vehicle management server 200 by using a wireless communication function of the communication device 110. The electronic device 120 updates a current program stored in the electronic device 120 based on an update program received from the vehicle management server 200. All the electronic devices 120 of the vehicle 100 need not be the devices having programs that are updatable.

The display device 130 is an information terminal having a display screen for displaying update event information about a program update process for any electronic device 120. The display device 130 displays a screen of a predetermined notification or permission request based on an instruction to display an indication associated with an update event that is transmitted from the electronic device 120 via the internal network, or an instruction to display an indication associated with an update event that is transmitted from the vehicle management server 200 via the wireless network. Examples of the display device 130 include a multi-information display and a car navigation device mounted on the vehicle 100.

The mobile device 300 is an information terminal having a display screen for displaying update event information about a program update process for any of the electronic devices 120. The update event information is received via the communication device 110. The mobile device 300 displays a screen of a predetermined notification or permission request based on an instruction to display an indication associated with an update event that is transmitted from the electronic device 120 via the wireless network, or an instruction to display an indication associated with an update event that is transmitted from the vehicle management server 200 via the wireless network. Examples of the mobile device 300 include a smartphone, a tablet device, a personal computer, and other general-purpose devices of the user of the vehicle 100.

In the program update system 10 of FIG. 1, the information terminal configured to display update event information related to a program update process for any of the electronic devices 120 includes the display device 130 and the mobile device 300, but may be any one of the display device 130 and the mobile device 300. The information terminal may include devices other than the display device 130 and the mobile device 300 as long as the update event information can be displayed and presented to the vehicle user. The instruction to display the update event information on the display device 130 or the mobile device 300 may be given from the electronic device 120 that is executing the update, or from the vehicle management server 200 that receives an update status as appropriate from the electronic device 120 that is executing the update.

Control

Figure 3:
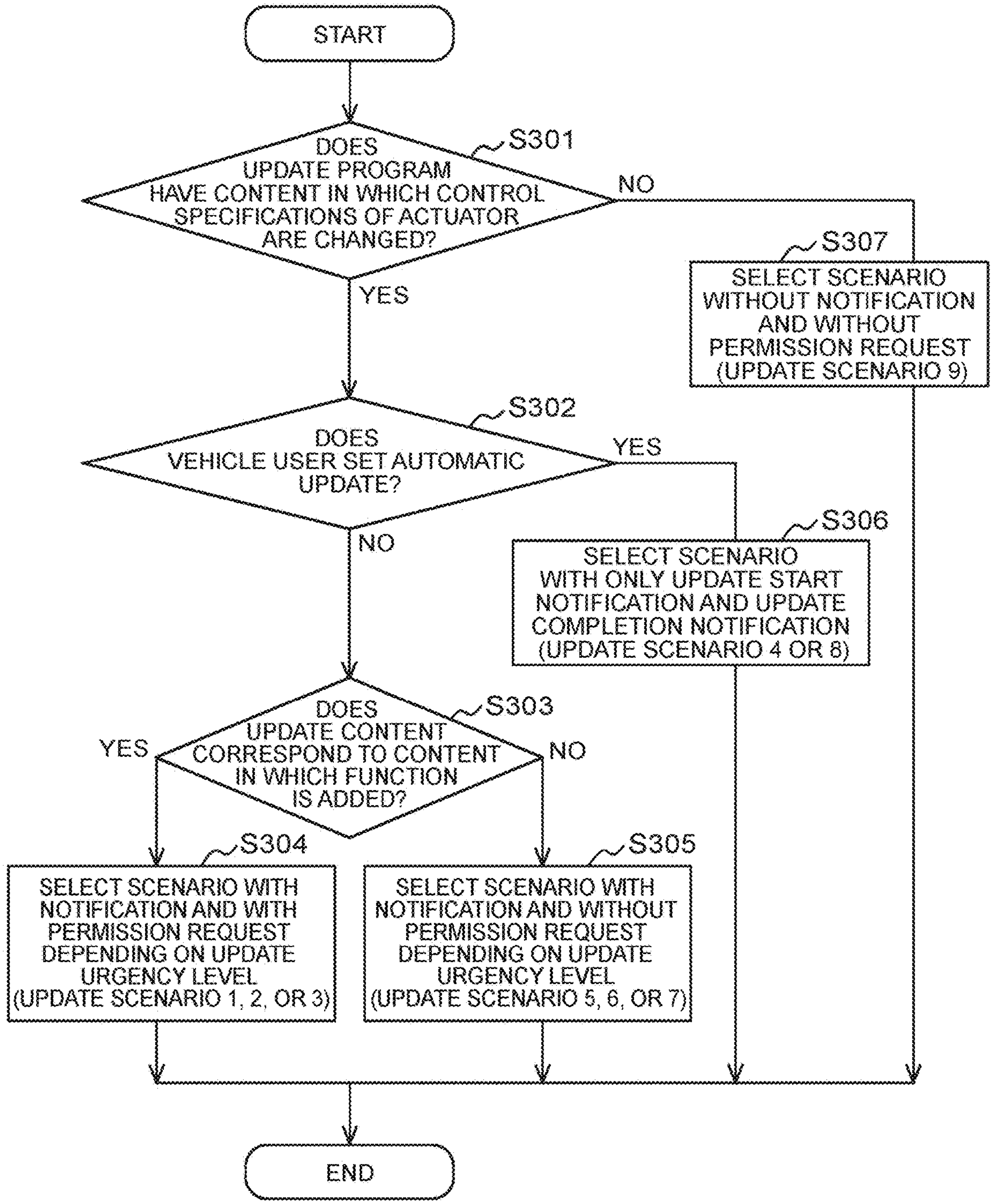
FIG. 3 is a flowchart of a process of selecting an update scenario to be linked to an update program executed by a controller of the vehicle management server.

A process to be executed by the vehicle management server 200 of the program update system 10 is described with reference to FIG. 3. FIG. 3 is a flowchart illustrating a procedure of a process of selecting an update scenario to be linked to an update program executed by the controller 230 of the vehicle management server 200 according to this embodiment.

For example, the process illustrated in FIG. 3 is started when the vehicle 100 inquires of the vehicle management server 200 whether there is a program update using an update program stored in the storage 220 of the vehicle management server 200.

Step S301: The controller 230 of the vehicle management server 200 determines whether the inquired update program for the vehicle 100 has a content in which control specifications of an actuator of the vehicle 100 are changed. When the update program has the content in which the control specifications of the actuator are changed (Step S301: YES), the process proceeds to Step S302. When the update program does not have the content in which the control specifications of the actuator are changed (Step S301: NO), the process proceeds to Step S307.

Step S302: The controller 230 of the vehicle management server 200 determines whether the vehicle user sets the automatic update in the vehicle 100. Information as to whether the automatic update is set may be transmitted from the vehicle 100 to the vehicle management server 200 with the information being contained in the inquiry about whether there is a program update, or may be acquired by the vehicle management server 200 by sending a request to the vehicle 100 after the inquiry is received. When the automatic update is set (Step S302: YES), the process proceeds to Step S306. When the automatic update is not set (Step S302: NO), the process proceeds to Step S303.

Step S303: The controller 230 of the vehicle management server 200 determines whether the update content of the update program is a content in which a new function is added to the vehicle. When the update content is the content in which a function is added (Step S303: YES), the process proceeds to Step S304. When the update content is not the content in which a function is added (Step S303: NO), the process proceeds to Step S305.

Step S304: The controller 230 of the vehicle management server 200 selects an update scenario depending on the update urgency level of the update program. In this embodiment, the controller 230 selects one update scenario from among update scenarios 1, 2, and 3 of FIG. 2, which define update events "with notification and with permission request". Through this selection, the controller 230 determines a content in which at least one of the data DL permission request and the activation permission request is presented to the vehicle user as an update status. When the update scenario is selected in Step S304, the selected update scenario is linked to the update program, and this process is terminated.

Step S305: The controller 230 of the vehicle management server 200 selects an update scenario depending on the update urgency level of the update program. In this embodiment, the controller 230 selects one update scenario from among update scenarios 5, 6, and 7 of FIG. 2, which define update events "with notification and without permission request". Through this selection, the controller 230 determines a content in which neither the data DL permission request nor the activation permission request is presented to the vehicle user as an update status. When the update scenario is selected in Step S305, the selected update scenario is linked to the update program, and this process is terminated.

Step S306: The controller 230 of the vehicle management server 200 selects update scenario 4 or 8 of FIG. 2, which defines update events with only "update start notification and update completion notification". Through this selection, the controller 230 determines a content in which only the update start notification and the update completion notification are presented to the vehicle user as update statuses. When the update scenario is selected in Step S306, the selected update scenario is linked to the update program, and this process is terminated.

Step S307: The controller 230 of the vehicle management server 200 selects update scenario 9 of FIG. 2, which defines an update event "without notification and without permission request". Through this selection, the controller 230 determines a content in which none of the notifications and the permission requests is presented to the vehicle user as an update status. When the update scenario is selected in Step S307, the selected update scenario is linked to the update program, and this process is terminated.

In the update process of the update program to which any update scenario is linked, the vehicle management server 200 transmits, to the vehicle 100, information for causing the display device 130 and/or the mobile device 300 to display an indication associated with the update event defined in the update scenario linked to the update program as an indication related to the update status to be presented to the vehicle user. For example, the vehicle management server 200 may transmit the update scenario to the vehicle 100 together with the update program, and the electronic device 120 that receives the update scenario may cause the display device 130 to display a predetermined notification and/or permission request based on the update scenario depending on progress of the update process of the update program, and/or may cause the mobile device 300 to display the predetermined notification and/or permission request via the communication device 110 or the vehicle management server 200. Alternatively, the vehicle management server 200 may receive notifications of the progress of the update process of the update program from the electronic device 120 at appropriate timings, and cause the display device 130 to display the predetermined notification and/or permission request based on the update scenario depending on the progress, and/or cause the mobile device 300 to display the predetermined notification and/or permission request, via the communication device 110.

In this embodiment, each update scenario is defined for the case where an update program is downloaded from the vehicle management server 200 to the vehicle 100 through wireless communication to execute an update process for an existing program. Each update scenario may further be defined for a case where an update process for an existing program is executed by using an update program that requires the update to be executed in a dealer or other maintenance shops. In this case, an engineer of the maintenance shop executes the update process, and therefore the vehicle user does not generally need to grasp the progress of the update process from moment to moment. Thus, the update scenario may define, for example, only the update start notification or the update completion notification as the update event.

In this embodiment, the controller 230 may select an update scenario for an update program not only based on the property of the update program but also based on the conditions of each vehicle, such as a vehicle traveling distance or a component manufacture timing acquired from the vehicle.

In this embodiment, the controller 230 may further control various types of display based on the property of an update program in relation to or apart from an update scenario. For example, when the update program has any one of the following properties (1) to (3), the controller 230 may acquire information indicating the property from the vehicle management server 200, and cause the information terminal (display device 130 or mobile device 300) to display the information. In this case, the information terminal (display device 130 or mobile device 300) preferably displays the information in such a manner that the user is notified of the information with priority before an update process to securely recognize the information. The program may be (1) a program required to notify the user of a program update in accordance with laws and regulations, (2) a program having a relatively significant effect on convenience, for example, because individual setting values customized by the user in the vehicle are reset, or (3) an update program having a relatively significant effect on convenience because the vehicle is required to stop in a garage or the like over a long time for an update process due to a relatively large size and a required update process time equal to or longer than a predetermined time.

In this embodiment, the update start notification in, for example, update scenario 4 or 8 may include a notification of forcible execution of the update without user's permission. In this case, the information terminal (display device 130 or mobile device 300) preferably displays information in such a manner that the user is notified of the information with priority to securely recognize the information. The notification of forcible execution of the update process may be displayed independently of the display of the update start notification.

Actions and Effects

As described above, in the program update system 10 according to the embodiment of the technology disclosed herein, the vehicle management server 200 prestores the update scenarios that define the update events (completion notifications and permission requests) to be displayed based on the update contents of the update programs and the update urgency levels, and indicate whether the vehicle user sets the automatic update. To update an existing program of any electronic device 120, information for causing the information terminal (display device 130 or mobile device 300) to display an indication related to an update status determined depending on the type of an update program and to be presented to the vehicle user, that is, an indication associated with an update event defined in an update scenario linked to the update program is transmitted from the vehicle management server 200 to the vehicle 100.

Through this process, the update status to be displayed on the information terminal such as the display device 130 or the mobile device 300 can suitably be set depending on the type of the update program or the like. Thus, it is possible to reduce the feeling of annoyance or anxiety of the vehicle user about the indications of the update statuses in the update process for the program.

Although the embodiment of the technology disclosed herein is described above, the technology disclosed herein may be regarded not only as the program update system and the vehicle management server but also as, for example, a method for transmitting an update program, a control program for the method, a non-transitory computer readable storage medium storing the control program, and a vehicle including the program update system.

The technology disclosed herein is effective in a program update system for electronic devices mounted on a vehicle or the like, and in a vehicle management server included in the system.

What is claimed is:

1. A vehicle management server configured to transmit to a vehicle an update program for updating an existing program of an electronic device mounted on the vehicle, the vehicle management server comprising:

a communicator configured to communicate with the vehicle; and a controller configured when information indicating that a vehicle user sets permission for an automatic update is received from the vehicle via the communicator, and when a type of the update program is a type with a content to improve an existing function of the vehicle:

(i) to transmit information to notify the vehicle user only a notification of start of an update process and a notification of completion of the update process; and (ii) not to transmit information to notify the vehicle user of a permission request for execution of the update process.

2. The vehicle management server according to claim 1, wherein the controller is configured to determine information to be provided to the vehicle user based on an update urgency level when the information indicating that the vehicle user sets permission for an automatic update is not received from the vehicle via the communicator.

3. The vehicle management server according to claim 1, wherein the controller is configured to determine the information to be provided to the vehicle user based on the type of the update program when the information indicating that the vehicle user sets permission for an automatic update is not received from the vehicle via the communicator.

4. The vehicle management server according to claim 3, wherein the type of the update program is determined in accordance with an update content and an update urgency level.

5. The vehicle management server according to claim 4, wherein the update content includes a content in which control specifications of an actuator of the vehicle are changed, and a content in which the control specifications of the actuator of the vehicle are not changed.

6. The vehicle management server according to claim 5, wherein the content in which control specifications of an actuator of the vehicle are changed are classified into:

contents in which a new function that is not previously installed in the vehicle is added and the user of the vehicle needs to permit the update process, and contents in which an existing function that is already installed in the vehicle is modified or solutions or measures are added to the existing function and the user of the vehicle need not permit the update process.

7. The vehicle management server according to claim 2, wherein the update urgency level is classified into at least two groups in accordance with the content of the update program.

8. The vehicle management server according to claim 1, wherein the type of the update program is a type with a content in which control specifications of an actuator of the vehicle are changed.

9. The vehicle management server according to claim 1, wherein the type of the update program is a type with a content in which control specifications of an actuator of the vehicle are not changed.

10. A vehicle management system, comprising:

a user terminal configured to display information; and a vehicle management server configured to transmit to a vehicle an update program for updating an existing program of an electronic device mounted on the vehicle, including:

a communicator configured to communicate with the vehicle; and a controller configured when information indicating that a vehicle user sets permission for an automatic update is received from the vehicle via the communicator, and when a type of the update program is a type with a content to improve an existing function of the vehicle:

(i) to transmit information to notify the vehicle user via the user terminal only a notification of start of an update process and a notification of completion of the update process; and (ii) not to transmit information to notify the vehicle user via the user terminal of a permission request for execution of the update process.

11. The vehicle management system according to claim 10, wherein the controller is configured to determine information to be provided to the vehicle user based on an update urgency level when the information indicating that the vehicle user sets permission for an automatic update is not received from the vehicle via the communicator.

12. The vehicle management system according to claim 10, wherein the controller is configured to determine the information to be provided to the vehicle user based on a type of the update program when the information indicating that the vehicle user sets permission for an automatic update is not received from the vehicle via the communicator.

13. The vehicle management system according to claim 12, wherein the type of the update program is determined in accordance with an update content and an update urgency level.

14. The vehicle management system according to claim 13, wherein the update content includes a content in which control specifications of an actuator of the vehicle are changed, and a content in which the control specifications of the actuator of the vehicle are not changed.

15. The vehicle management system according to claim 14, wherein the content in which control specifications of an actuator of the vehicle are changed are classified into:

contents in which a new function that is not previously installed in the vehicle is added and the user of the vehicle needs to permit the update process, and contents in which an existing function that is already installed in the vehicle is modified or solutions or measures are added to the existing function and the user of the vehicle need not permit the update process.

16. The vehicle management system according to claim 11, wherein the update urgency level is classified into at least two groups in accordance with the content of the update program.

17. The vehicle management system according to claim 10, wherein the user terminal is a multi-information display that is coupled with the controller via a controller area network.

18. The vehicle management system according to claim 10, wherein the user terminal is a mobile device.

19. The vehicle management system according to claim 10, wherein the type of the update program is a type with a content in which control specifications of an actuator of the vehicle are changed.

20. The vehicle management system according to claim 10, wherein the type of the update program is a type with a content in which control specifications of an actuator of the vehicle are not changed.

* * * * *